(12) United States Patent
Riedl

(10) Patent No.: US 7,083,196 B2
(45) Date of Patent: Aug. 1, 2006

(54) HEIGHT-ADJUSTABLE SUPPORT FOR SEMITRAILERS OR THE LIKE

(75) Inventor: Reinhold Riedl, Miltenberg (DE)

(73) Assignee: Georg Fischer Verkehrstechnik GmbH, Singen (DE)

( * ) Notice: Subject to any disclaimer, the term of this patent is extended or adjusted under 35 U.S.C. 154(b) by 0 days.

(21) Appl. No.: 11/031,401

(22) Filed: Jan. 7, 2005

(65) Prior Publication Data

US 2005/0173910 A1 Aug. 11, 2005

(30) Foreign Application Priority Data

Feb. 5, 2004 (DE) ............... 20 2004 001 707 U

(51) Int. Cl.
*B60S 9/06* (2006.01)
(52) U.S. Cl. .................. 280/763.1; 280/766.1; 254/419; 248/188.2; 248/354.7
(58) Field of Classification Search ........... 280/766.1, 280/475, 762, 763.1, 764.1; 254/103, 419, 254/424, 425; 248/422, 188.2, 354.7
See application file for complete search history.

(56) References Cited

U.S. PATENT DOCUMENTS

| 5,199,738 | A | * | 4/1993 | VanDenberg | 280/766.1 |
| 5,238,266 | A | * | 8/1993 | VanDenberg | 280/766.1 |
| 5,538,225 | A | * | 7/1996 | VanDenberg | 254/419 |
| 5,676,018 | A | * | 10/1997 | VanDenberg | 74/373 |
| 6,684,726 | B1 | * | 2/2004 | Schmidt et al. | 74/342 |
| 6,846,016 | B1 | * | 1/2005 | VanDenberg et al. | 280/763.1 |
| 2003/0006599 | A1 | * | 1/2003 | VanDenberg et al. | 280/766.1 |
| 2004/0075262 | A1 | * | 4/2004 | Alguera et al. | 280/766.1 |

* cited by examiner

*Primary Examiner*—J. Allen Shriver
(74) *Attorney, Agent, or Firm*—Bachman & LaPointe, P.C.

(57) ABSTRACT

A height-adjustable support for semitrailers, having a stationary outer support tube, an inner support tube, which is arranged in a longitudinally displaceable manner therein, and a gearbox output shaft, on which is seated in a rotationally fixed manner a bevel wheel of relatively small diameter which belongs to a bevel wheel gear stage which drives the spindle drive for the purpose of displacing the inner support tube, the drive shaft being hollow at least in its end region opposite the drive side or having a hollow extension fitted thereon.

6 Claims, 4 Drawing Sheets

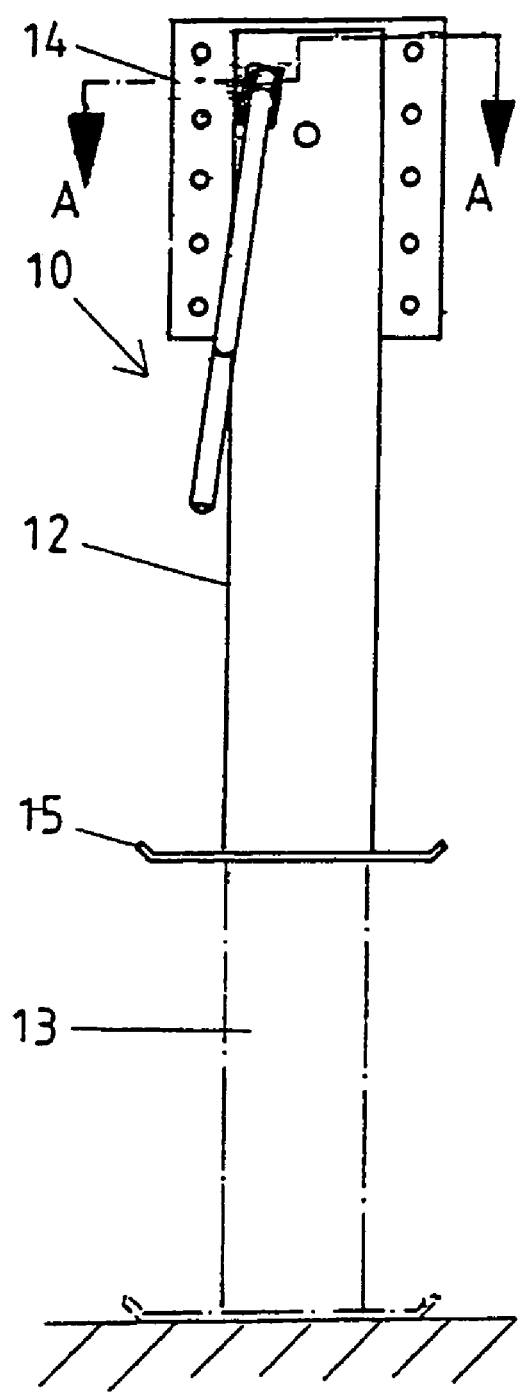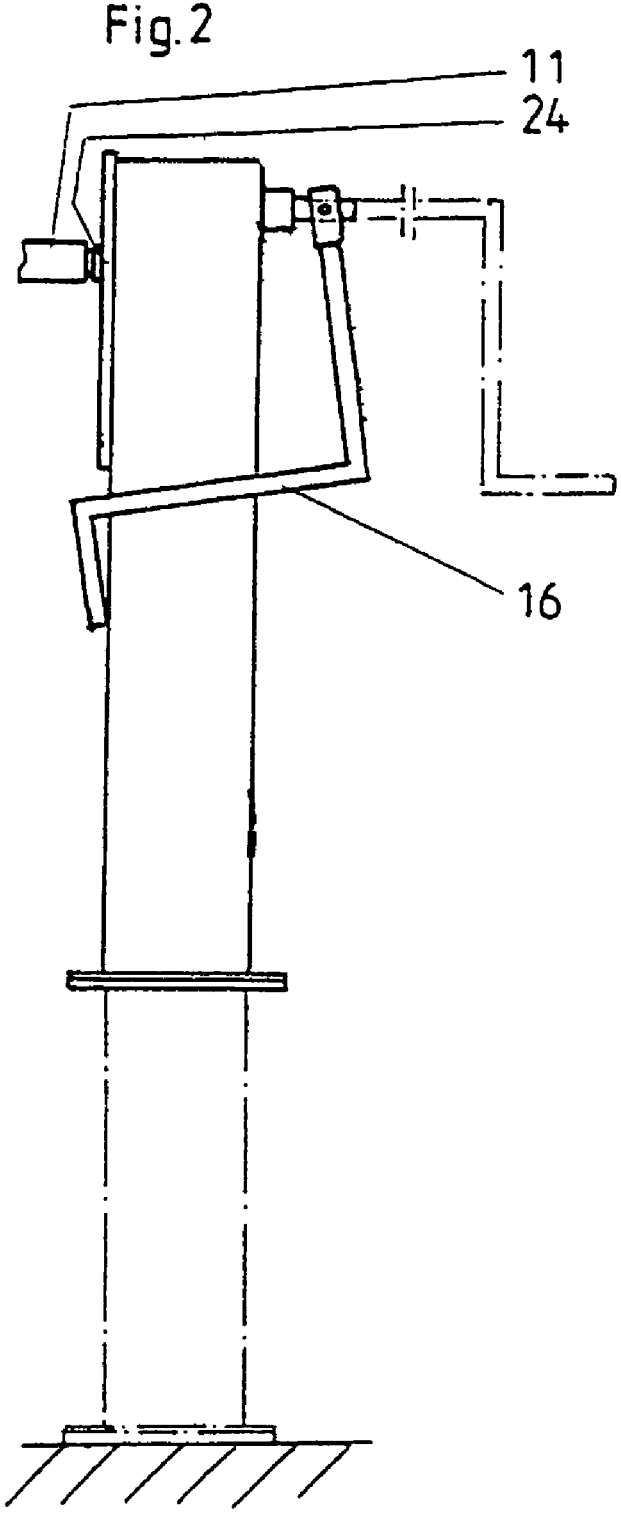

HEIGHT-ADJUSTABLE SUPPORT FOR SEMITRAILERS OR THE LIKE

BACKGROUND OF THE INVENTION

The invention relates to a height-adjustable support for semitrailers or the like and, more particularly, a height adjustable support having as stationary outer support tube and an inner support tube which is displaceable therein.

Such supports are arranged, usually in pairs, on the front region of the semitrailer.

A support of the generic type is known from DE 203 07 381 U1. In this case, the manual-drive shaft is mounted, behind the manual-drive pinion, in a bearing which is arranged in the central region of the outer support tube and a bearing in the front wall thereof. Only in the case of the manual drive being used is the manual-drive shaft, following axial displacement, additionally mounted, via an end-side bearing journal, in front of the manual-drive pinion in the rear wall of the outer support tube. The central bearing gives rise to a certain amount of structural outlay.

DE 20 2004 001 054.2 relates to a support in which the pinion of the manual-drive shaft is mounted merely in a floating manner, which also applies when the manual drive is used. A relatively large amount of structural outlay is likewise necessary here for the bearing in the vicinity of the center of the outer support tube, especially since an adjacent motor arrangement makes the bearing more difficult to configure and fasten.

The object of the invention is to provide a support for semitrailers with more straightforward mounting of the drive shaft, which is optimum in terms of design and cost.

SUMMARY OF THE INVENTION

The foregoing object is achieved by providing for the drive shaft to be of concentrically hollow configuration at least in its front end region, i.e. in the end region which is located in the outer support tube, and to be mounted on a fixed cylindrical bearing journal which is seated on the inside of the rear wall of the outer support tube. A second mounting can take place in a bearing body which is seated in the front wall of the outer support tube.

If the drive shaft is provided externally with a toothing formation in the end region mentioned, it is additionally possible for the drive moment to be transmitted to a gear-wheel which is arranged parallel thereto, and preferably therebeneath.

If the concentric hollow region of the drive shaft is formed by a bearing bore which is approximately double the depth of the tooth width of the toothing formation, and if the length of the bearing journal is also configured in accordance with this dimension, very advantageous and cost-effective mounting is achieved according to the invention. This is because, in the case of driving, with the drive shaft pushed all the way in, the latter overlaps the entire length of the bearing journal, and the radial forces which occur, inter alia, during rolling of the gearwheels, are reliably dissipated by the bearing journal. When there is no driving taking place, in which case the drive shaft is displaced axially outward by somewhat more than the tooth width in order that the gearwheels are disengaged, the mounting is nevertheless maintained because the drive shaft and bearing journal still overlap to a sufficient extent.

Instead of a bearing bore of the abovedescribed depth being introduced into the end side of the drive shaft, it is also advantageously possible to use a hollow pinion which is fitted, for example, on an end-side journal of the drive shaft, and connected to the latter, and the other inner region of which serves for mounting on the bearing journal.

It may also be advantageous for the entire drive shaft to be produced from a tube.

Another idea is to configure the bearing body for mounting the drive shaft in the front wall of the outer support tube such that it can be inserted into the outer support tube from the inside and flanged on and need merely be screw-connected from the outside, which gives the support a more compact construction.

BRIEF DESCRIPTION OF THE DRAWINGS

The invention will be explained hereinbelow with reference to the drawings, in which:

FIG. 1 shows a front view of the support according to the invention,

FIG. 2 shows a side view of the support shown in FIG. 1,

DETAILED DESCRIPTION

Figure 3:
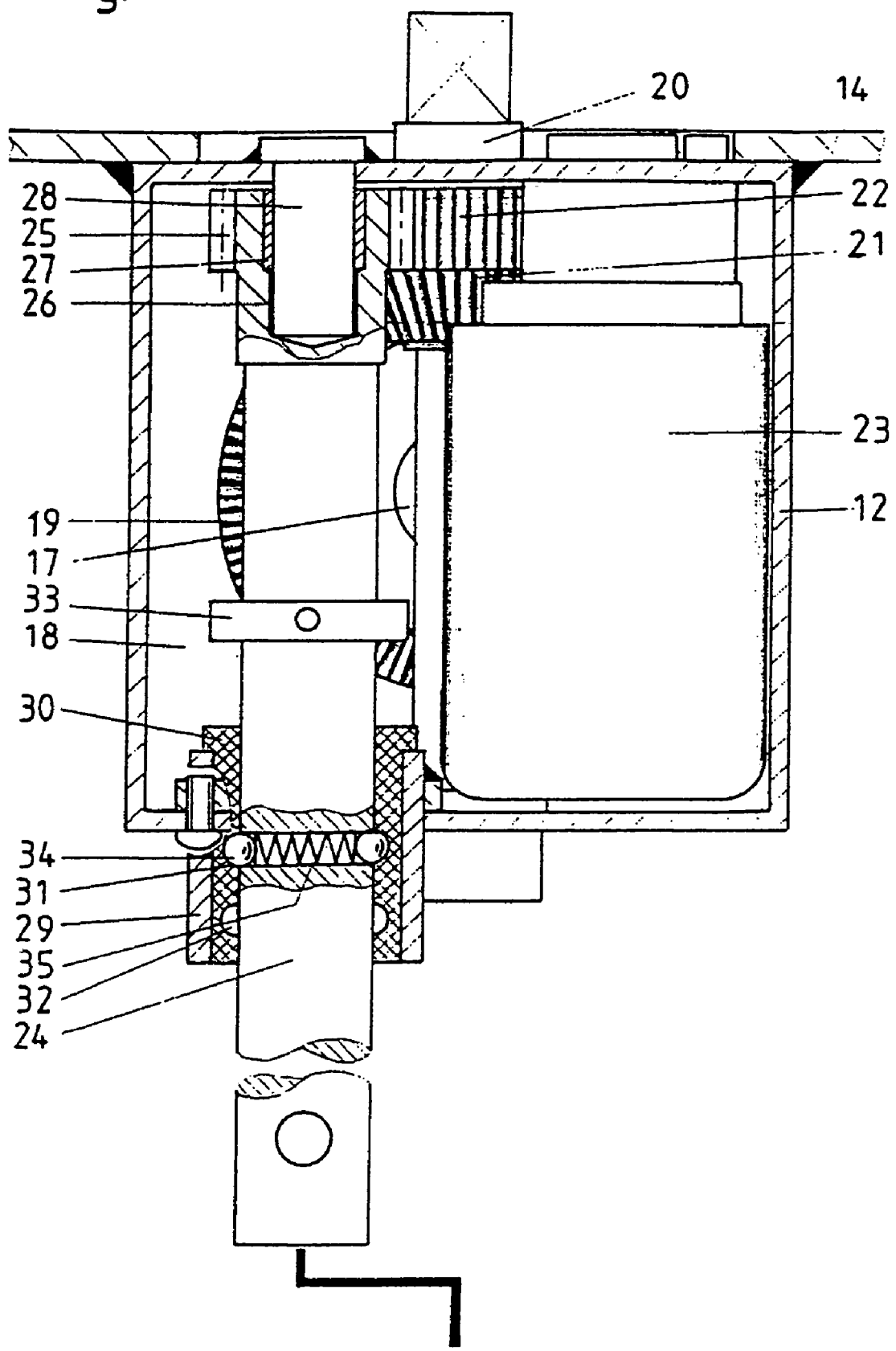
FIG. 3 shows a cross section of the support along line A—A in FIG. 1 with the drive shaft in the functioning position.

The support 10 shown in FIGS. 1 to 5 is fastened in a paired arrangement on the chassis of a semitrailer, in the front region thereof, and is retracted, i.e. in the shortened state, in the transporting position. The supports 10 are extended before the semitrailer is uncoupled from the articulated lorry.

Since the supports 10 of each pair are of more or less identical construction and because the second support, which is usually driven along from a first support 10 via a connection shaft 11, differs from the first support mainly just by way of a more straightforward gear mechanism, with only one bevel-wheel stage, it will suffice here to describe a drive-side support 10.

The support 10 has an outer support tube 12 and an inner tube 13 mounted in a longitudinally displaceable manner therein.

The outer support tube 12 and the inner support tube 13 have a square cross section.

The support 10 is fastened, on its rear side, on the semitrailer via a screw-on plate 14 seated on the outer support tube 12.

A foot 15 for support on the ground is fastened at the bottom end of the inner support tube 13.

Located on the front side of the support 10 is a pivot-away hand crank 16 for the manual drive.

The support 10 has a spindle 17 which moves a nut on which the inner support tube 13 is fastened.

The spindle drive is supported, via an axial bearing, against a bearing plate 18 which is welded horizontally into the outer support tube 12. Located above the bearing plate 18, on a journal of the spindle 17, is a bevel wheel 19, which is pinned to this journal.

Arranged horizontally in the center of the support 10, and above the bevel wheel 19, is a gearbox output shaft 20 which is mounted in the walls of the outer support tube 12.

A bevel wheel 21 of relatively small diameter and a gearwheel 22 are seated in a rotationally fixed manner on the gearbox output shaft 20.

Located above the gearbox output shaft 20, parallel to the latter and in a laterally offset manner, is a motor 23, of which the drive pinion meshes with the gearwheel 22.

Likewise located above the gearbox output shaft 20, parallel to the latter and in a laterally offset manner opposite the motor 23, is a drive shaft 24 for the manual drive.

The drive shaft 24 has a thickened portion, which is designed as gearwheel 25, in the inner end region. In the same end region, the drive shaft 24 has a concentric bearing bore 26, of which the depth corresponds approximately to double the width of the gearwheel 25.

A bushing 27 is pressed into the bearing bore 26.

A fixed bearing journal 28 is fitted on the rear wall of the outer support tube 12 and projects horizontally, and in an axis-parallel manner in relation to the gearbox output shaft 20, into the outer support tube 12.

A bearing body 29, which is inserted into the front wall of the outer support tube 12 from the inside and is screwed to the outer support tube 12 from the outside, is located in alignment with the bearing journal 28.

The bearing body 29 contains a collared bushing 30 which has two axially spaced-apart semicircular radial grooves 31, 32 on the inside.

The drive shaft 24 is mounted on the bearing journal 28, and in the bearing body 29, and can be displaced axially for the purpose of switching the manual drive on and off.

The sliding distance of the drive shaft 24 is somewhat more than the tooth width of its gearwheel 25 and is limited from the outside by an adjusting ring 33 which is seated on the drive shaft 24.

The switching positions of the drive shaft 24 for engagement of the gearwheel 25 in the gearwheel 22 or for releasing the drive shaft are determined by way of an arresting action by means of two balls 34 which are mounted in a transverse bore in the drive shaft 24 and are forced by a compression spring 35, depending on the case in hand, into the radial groove 31 or 32.

FIG. 3 shows the drive shaft 24 in the switching position in which the gearwheel 25 engages with the gearwheel 22 and the shaft is arrested axially in the radial groove 31.

Figure 4:
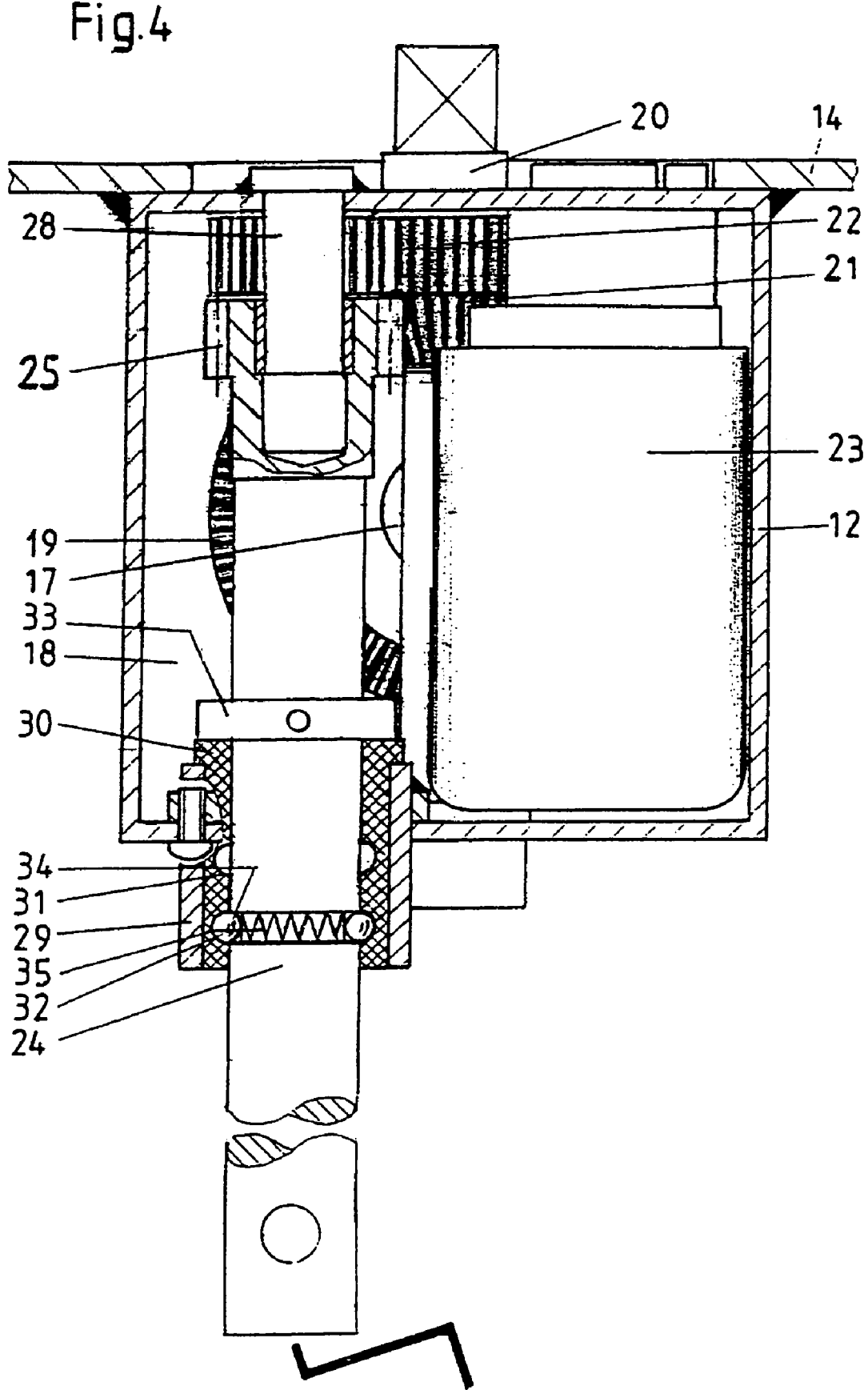
FIG. 4 shows a cross section of the support along line A—A in FIG. 1 with the drive shaft in the non-functioning position.

FIG. 4 shows the drive shaft 24 in a switching position in which it has been drawn out to some extent, the gearwheels 25, 22 being disengaged and the shaft being arrested correspondingly in the radial groove 32.

Figure 5:
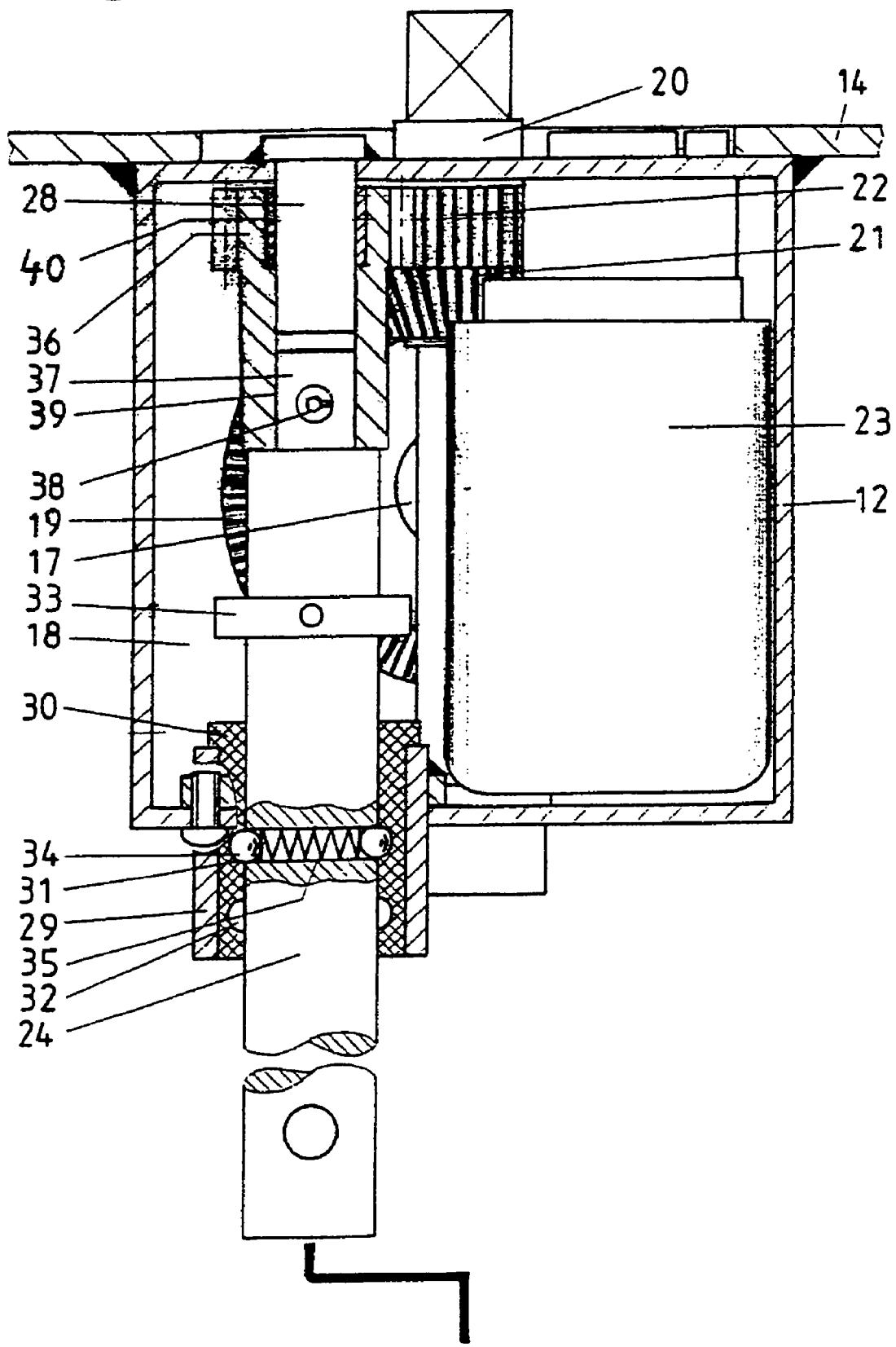
FIG. 5 shows a cross section of the support along line A—A corresponding to FIG. 3, but with an alternative configuration of the drive shaft.

According to FIG. 5, a separate pinion 36 is positioned on an end journal 37 of the drive shaft 24 and pinned to this drive shaft by means of a dowel pin 38.

The pinion 36 has a concentric bore 39, in which a bearing bushing 40 is seated, and is mounted on the bearing journal 28.

The invention claimed is:

1. Height-adjustable support comprising a stationary outer support tube, an inner support tube, which is arranged in a longitudinally displaceable manner therein, and a gearbox output shaft, on which is seated in a rotationally fixed manner a bevel wheel of relatively small diameter which belongs to a bevel wheel gear stage which drives a spindle drive for the purpose of displacing the inner support tube, wherein a drive shaft has a drive side and an end region opposite the drive side, the end region includes a hollow portion wherein the hollow portion, the hollow portion has a concentric bearing bore, wherein a rear side of the outer support tube is provided with an inwardly oriented bearing journal on which the drive shaft is mounted by way of the concentric bearing bore and is axially displaceable thereon.

2. Support according to claim 1, wherein the hollow portion includes a gearwheel which is rotationally fixed on the drive shaft.

3. Support according to claim 1, wherein a gearwheel is mounted on the bearing journal.

4. Support according to claim 1, wherein a bearing body is inserted into a front wall of the outer support tube from the inside thereof and flanged on and screwed on from the outside thereof.

5. Support according to claim 4, wherein the bearing body has flange regions which project above and beneath the drive shaft.

6. Support according to claim 1, wherein the drive shaft is a tube.

* * * * *